United States Patent Office 2,751,397
Patented June 19, 1956

1

2,751,397

REDUCTION OF 11α-ACYLOXY PREGNENES

Alan H. Nathan and John A. Hogg, Kalamazoo Township, Kalamazoo County, Mich., assignors to The Upjohn Company, Kalamazoo, Mich., a corporation of Michigan No Drawing. Application August 28, 1952,
Serial No. 306,941

11 Claims. (Cl. 260—397.3)

This invention relates to certain steroid compounds and is more particularly concerned with a process for the production and use of 11α-acyloxypregnane-3,20-diones and with certain novel steroids produced therefrom.

This application is a continuation-in-part of Serial Number 244,744, filed August 31, 1951, now Pat. No. 2,647,134.

It is an object of the present invention to provide a process for the production of 11α-acyloxypregnane-3,20-diones, especially the normal isomer thereof. Another object is the provision of a process for the production and use of 11α-acyloxypregnane-3,20-diones. A further object is the provision of a process, in the preparation of pregnane-3,11,20-trione, for the production and use of the novel pregnane-3α,11α,20-triol and the novel 11α-acyloxypregnane-3α,20-diol, which are prepared from 11α-acyloxypregnane-3,20-diones by reduction. Another object of the invention is the provision of a process for the production of the useful pregnane-3,11,20-trione in high yields from 11α-hydroxyprogesterone by a unitary procedure which proceeds through 11α-acyloxyprogesterones and in which all of the steps cooperate, or integrate to avoid certain problems present in previously available procedures for attainment of this result. Other objects will be apparent to those skilled in the art to which this invention pertains.

According to the present invention, 11α-acyloxypregnane-3,20-diones, especially the normal isomer thereof, are prepared by the hydrogenation of an 11α-acyloxyprogesterone in the presence of a palladium hydrogenation catalyst. The 11α-acyloxypregnane-3,20-diones are then converted, in substantially quantitative yields, to the novel pregnane-3α,11α,20-triol by reduction and hydrolysis, with possible production of the novel intermediate pregnane 11α-acyloxypregnane-3,20-diol. The pregnane-3α,-11α,20-triol is converted by oxidation to the known pregnane-3,11,20-trione. The complete reaction sequence is illustrated graphically by the following formulae:

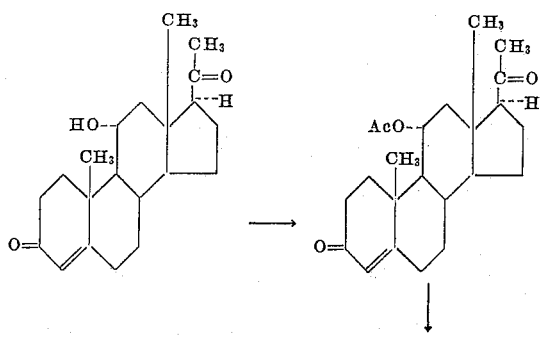

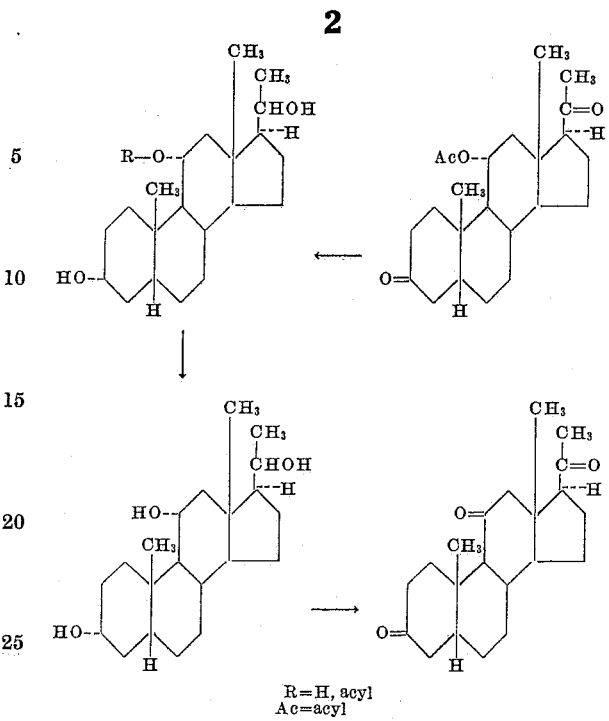

R=H, acyl
Ac=acyl

Thus, pregnane-3,11,20-trione, which can be converted to cortisone acetate by methods known in the art, is prepared in high yield from 11α-hydroxyprogesterone. For example, pregnane-3,11,20-trione can be selectively hydrogenated according to the procedure of Reichstein et al. [Von Euw, Lardon and Reichstein, Helv. Chim. Acta, 27, 821 (1944)] to yield pregnane-3-ol-11,20-dione, which can be converted to cortisone acetate by the method of Gallagher and co-workers [Kritchevsky, Garmaise and Gallagher, J. Am. Chem. Soc., 74, 483 (1952)].

An alternate and apparently equivalent route to pregnane-3,11,20-trione from 11α-hydroxyprogesterone would appear to be by hydrogenation of 11α-hydroxyprogesterone, without acylation, followed by oxidation. In utilizing either such route or the present route in the preparation of pregnane-3,11,20-trione from 11α-hydroxyprogesterone, the important step is the saturation, with hydrogen, of the double bond in the 4(5)-position so that the resulting hydrogenated product will have the normal configuration at the 5-position. According to the method of the present invention, hydrogenation of the 4(5)-double bond results in the production of the normal isomer in high yields.

Production of the normal isomer, and in such high yields, is wholly unexpected in view of the prior art experience which shows that hydrogenation of the double bond in the 4(5)-position generally results in the formation of the allo configuration at carbon atom five or a mixture of the normal and allo configurations with the allo form predominating [Butenandt, Tscherning and Hanisch, Berichte, 68, 2097 (1935); Butenandt and Fleischer, Berichte, 68, 2094 (1935)]. A recent report by Pataki, et al., J. Biol. Chem., 195, 751 (1952) showed that the catalytic hydrogenation of 11-oxygenated Δ⁴-3-ketosteroids leads chiefly to the allo isomer. It was found that hydrogenation of corticosterone acetate (11β-hydroxy-21-acetoxy-progesterone) with a ten per cent palladium-barium sulfate catalyst gave seventy per cent of the allo isomer;

hydrogenation of 11-ketoprogesterone in a similar manner gave 68 per cent of the pure allo isomer; hydrogenation of Kendall's Compound F acetate (11β,17α-dihydroxy-21-acetoxyprogesterone) gave 82 per cent allo isomer. Hydrogenation of cortisone acetate (11-keto-17α-hydroxy-21-acetoxyprogesterone) with a ten per cent palladium-barium sulfate catalyst gave seventy per cent of the allo isomer [Djerassi, et al., J. Biol. Chem., 194, 115 (1952)]. Similarly, Mason, et al., J. Biol. Chem., 120, 733 (1937), report a yield of eighty per cent of the allo isomer when hydrogenating dehydrocorticosterone (11-keto-21-hydroxyprogesterone) with hydrogen in the presence of palladium black catalyst.

Although hydrogenation of either 11α-hydroxyprogesterone or an 11α-acyloxyprogesterone yields predominantly the normal isomers, we have found that hydrogenating 11α-acyloxyprogesterones with hydrogen in the presence of a palladium catalyst results in higher yields of product of the normal configuration at the 5-position than when the 11α-acyloxy group is not present. When following the method of the present invention, hydrogenation of an 11α-acyloxyprogesterone, e. g., 11α-acetoxyprogesterone, with a 7.5 per cent palladium-zinc oxide-zinc carbonate catalyst in methanol results in a quantitative yield of hydrogenation product assaying 95 per cent 11α-acetoxypregnane-3,20-dione and only five per cent 11α-acetoxyallopregnane-3,20-dione. Similarly, improved yields of product of the normal configuration are obtained when using other palladium catalysts than are obtained when the same catalysts are used in the hydrogenation of starting compounds having the free 11α-hydroxy group. Since the yield of normal hydrogenated product is higher when an 11α-acyloxyprogesterone is hydrogenated than when 11α-hydroxyprogesterone is hydrogenated, and since 11α-acyloxyprogesterones can be prepared in sometimes quantitative yield from 11α-hydroxyprogesterone, acylation of 11α-hydroxyprogesterone prior to hydrogenation is therefore a method of converting 11α-hydroxyprogesterone to the normal pregnane series in higher yield than by direct hydrogenation of 11α-hydroxyprogesterone.

The fact that the hydrogenation of 11α-acyloxyprogesterone results mainly in the formation of the isomer having the normal configuration at the 5-position is of considerable commercial significance and utility. The present state of the art shows that in the preparation of physiologically active adrenal hormones such as, for example, cortisone from Δ4-pregnene compounds, it is necessary to eliminate the double bond while other transformations are accomplished in the molecule. When these transformations, i. e., formation of the desired side-chain, establishment of the desired group at position 11, and the like, are accomplished, the double bond is again introduced at the 4(5)-position. This step of reestablishing the double bond is dependent on the configuration of the molecule at position 5. Compounds with the allo configuration can be converted to the 4(5)-unsaturated compounds only with difficulty and in low yields, whereas in compounds with the normal configuration the double bond at the 4(5)-position can be formed easily and in good yields (U. S. Patent 2,590,993).

Since the known physiologically active adrenal cortical hormones possess an 11-keto function or an 11-hydroxy function, a desirable process for the use of 11α-acyloxypregnane-3,20-diones includes the conversion of the 11α-acyloxy group to an 11α-hydroxy or 11-keto group. Logically, saponification of the ester group would seem the best means of achieving this end. However, hydrolysis of the ester group to a hydroxy group with either acid or base always appears to cause at least some concomitant inversion of the side-chain to yield 17-iso pregnane compounds as evidenced by the reduced optical rotation of the product. The yield of desired product is therefore somewhat reduced. A convenient procedure for preventing this inversion of the side-chain is by reducing the 20-ketone to a 20-hydroxy group before hydrolysis is attempted. This is achieved, and frequently in quantitative yield, by treatment of an 11α-acyloxypregnane-3,20-dione with a reducing agent such as, for example, a large excess of sodium borohydride, or the like, in methanol or other alkanol, to reduce both the 3- and the 20-keto groups. The resulting 11α-acyloxypregnane-3α,20-diol can then be safely treated with a base to saponify the 11-acylate and give pregnane-3,11,20-triol. Alternatively, pregnane-3α,11α,20-triol can be prepared by treating 11α-acyloxypregnane-3,20-dione with lithium aluminum hydride and thereafter decomposing the complex with water, or slightly acidic or basic aqueous solution. The known pregnane-3,11,20-trione is then prepared by contacting pregnane-3α,11α,20-triol with about three equivalents of an oxidizing agent.

The starting steroid for the production of an 11α-acyloxypregnane-3,20-dione is an 11α-acyloxyprogesterone wherein the acyloxy group has the formula AcO, Ac being the acyl radical of an organic carboxylic acid, which in turn may be prepared by treatment of 11α-hydroxyprogesterone [Peterson and Murray, J. Am. Chem. Soc., 74, 1871 (1952)] with an acylating agent.

In carrying out the process of the present invention, 11α-acyloxyprogesterone, wherein the acyloxy group has the formula AcO, Ac being the acyl radical of an organic carboxylic acid, is contacted with hydrogen in the presence of a palladium hydrogenation catalyst such as, for example, palladium black, palladium on charcoal, palladium-barium sulfate, palladium on an ion exchange resin, palladium on calcium carbonate, palladium in the presence of zinc oxide, zinc carbonate, cadmium oxide, or the like, with or without added base, to produce an 11α-acyloxypregnane-3,20-dione. Since 11α-acetoxyprogesterone hydrogenates well and is readily prepared in practically quantitative yield from 11α-hydroxyprogesterone, 11α-acetoxyprogesterone is a preferred starting steroid. A preferred group of hydrogenation catalysts consists of palladium in the presence of a compound selected from the group consisting of the carbonate, oxide, and mixtures of the carbonate and oxide of a group 2B element of the periodic table, i. e., zinc, cadmium, and mercury, said catalysts influencing the hydrogenation in such a manner as to produce consistently high yields of product of the normal configuration. Of these catalysts, a palladium-zinc oxide catalyst consisting of from about five to about ten per cent by weight of precipitated palladium is preferred. Some of the above described palladium catalysts sometimes appear to be poisoned during the hydrogenation and the hydrogenation ceases prior to completion. Removal of the poisoned catalyst, shaking the partially hydrogenated solution with Raney nickel, and then continuing the hydrogenation with fresh catalyst is a satisfactory procedure to obtain complete hydrogenation when this occurs.

The above described hydrogenation appears to proceed well in a solvent consisting of an alkanol containing from one to eight carbon atoms, inclusive, particularly methanol, and one of these solvents is therefore employed in preferred operating conditions, although solvents such as, for example, ether acetic acid, or the like, may also be employed.

As previously stated, the structure of 11α-acyloxypregnane-3,20-dione can be altered to prevent inversion of the side-chain by contacting the steroid with a reducing agent to convert the 3- and the 20-keto groups to 3α- and 20-hydroxy groups, thus rendering the side-chain of the molecule stable to inversion by acid or base. Reducing agents preferred in carrying out the conversion of the keto groups to hydroxy groups are lithium aluminum hydride, sodium borohydride, lithium borohydride, and hydrogen in the presence of a hydrogenation catalyst such as, for example, Raney nickel, palladium, platinum, or the like. 11α-acyloxypregnane-3α,20-diols can be produced by the reaction of 11α-acyloxypregnane-3,20-diones with sodium borohydride. Pregnane-3α,11α,20-triol can be produced by the reaction of 11α-acyloxypregnane-3,20-dione with lithium aluminum hydride. In either case, pregnane-3α,11α,20-triol can be prepared by reacting 11α-acyloxypregnane-3,20-dione with a reducing agent, for example, lithium aluminum hydride, sodium borohydride, lithium borohydride, or hydrogen in the presence of a hydrogenation catalyst, and thereafter contacting the reduction mixture with a hydrolyzing agent. Hydrolyzing agents which may be employed include dilute bases and acids such as, for example, sodium hydroxide, sodium carbonate, hydrochloric acid, and others.

A particularly advantageous procedure for the preparation of pregnane-3α,11α,20-triol involves hydrogenating 11α-acyloxyprogesterone in an alkanol, preferably methanol, removing the hydrogenation catalyst and replacing it with sodium borohydride, preferably in excess to the amount theoretically required to reduce the 3- and 20-keto groups with added water, if desired, and thereafter refluxing the reduction mixture after adding a hydrolyzing agent such as, for example, sodium hydroxide, thereto. This preferred procedure produces, in high yield, pregnane-3α,11α,20-triol from 11α-acyloxyprogesterone without the necessity of intermediate purification or isolation, as shown in the examples following in this specification. Pregnane-3α,11α,20-triol can be readily converted by an oxidizing agent, for example, chromium trioxide, chromic acid, or potassium dichromate to the known pregnane-3,11,20-trione.

The following examples are illustrative of the process and products of the present invention but are not to be construed as limiting.

PREPARATION 1.—PALLADIUM CATALYST SUPPORTED ON ZINC OXIDE-ZINC CARBONATE MIXTURE

Eleven grams of anhydrous zinc chloride were dissolved in 100 milliliters of water at seventy degrees centigrade and a twenty per cent aqueous solution of sodium carbonate was added in excess, with constant stirring, forming a precipitate of zinc carbonate. The precipitate was filtered, washed free of alkali with warm water, and re-suspended in 100 milliliters of water forming a slurry. To the aqueous slurry was added five milliliters of a palladium chloride solution containing 0.1 gram of palladium per milliliter and then one milliliter of a thirty-seven per cent aqueous formaldehyde solution. The resulting red-brown colored mixture was warmed on a steam-bath to about sixty degrees centigrade and a thirty per cent aqueous solution of sodium hydroxide was added dropwise with continual stirring, until the pH of the mixture reached nine, at which point palladium precipitated. The black-colored precipitate was washed by decantation with ten successive fifty-milliliter portions of water and then filtered under suction. The precipitate on the filter funnel was washed six times, dried by suction, and heated in an oven at 210 degrees centigrade for eleven hours. Six and eight-tenths grams of a brown-colored catalyst consisting of palladium supported on a zinc-oxide zinc-carbonate mixture was obtained.

In a similar manner, and omitting the heating, a palladium on zinc carbonate catalyst was obtained. Likewise, palladium supported on mercury carbonate and palladium supported on cadmium carbonate catalysts are prepared. Other catalyst carriers or supports which can be prepared in this manner include the ion exchange resins such as, for example, Amberlite IRA 410, calcium carbonate, barium carbonate, barium sulfate, carbon, and others.

A. PRODUCTION OF 11α-ACYLOXY-PROGESTERONES

Example 1.—11α-acetoxyprogesterone

To a solution of 100.0 grams (0.304 mole) of 11α-hydroxyprogesterone [Peterson and Murray, J. Am. Chem. Soc., 74, 1871 (1952)] in 450 milliliters (4.7 moles) of acetic anhydride was added 45 milliliters of pyridine whereafter the whole was heated on a steam-bath for eighty minutes. The cooled reaction mixture was thereafter poured into four liters of ice and water and the whole was kept in a refrigerator for two days. The precipitated 11α-acetoxyprogesterone was then filtered, twice re-slurried with water and refiltered, and thereafter dried in vacuo at seventy degrees centigrade for three hours. The dried 11α-acetoxyprogesterone weighed 110.5 grams, a yield of 98 per cent of the theoretical, and melted at 172 to 176 degrees centigrade.

Example 2.—11α-formyloxyprogesterone

One gram of 11α-hydroxyprogesterone in twenty milliliters of 87 per cent formic acid was heated for two hours at 75 degrees centigrade. Upon incorporating 200 milliliters of water thereto, there precipitated 0.92 gram of crystals melting at 152 to 154 degrees centigrade. Two recrystallizations from forty-milliliter portions of 45 per cent formic acid gave 11α-formyloxyprogesterone melting at 158.5 to 161.5 degrees centigrade.

Example 3.—11α-propionyloxyprogesterone

A mixture of 6.70 grams of 11α-hydroxyprogesterone, thirty milliliters of propionic anhydride and thirty milliliters of pyridine was maintained at room temperature for about twenty hours. The solution was then poured into five hundred milliliters of ice water whereupon a colorless gum formed which soon crystallized. After hydrolysis of the excess propionic anhydride had occurred, the crystalline 11α-propionyloxyprogesterone, was collected, washed thoroughly with water, dried in air and thereafter in a vacuum desiccator over calcium chloride. The yield of 7.60 grams was 97.5 per cent of the theoretical. The thus-produced 11α-propionyloxyprogesterone had a melting point of 145.5 to 146 degrees centigrade and an optical rotation $[a]_D^{25}$ of plus 156 degrees (chloroform).

Analysis.—Percent calculated for $C_{24}H_{34}O_4$: C, 74.58; H, 8.87. Found: C, 74.84; H, 8.74.

Example 4.—11α-benzoyloxyprogesterone

11α-hydroxyprogesterone (0.5 gram) was dissolved in six milliliters of hot benzene and cooled to room temperature. Then 0.4 milliliter of freshly dried and redistilled pyridine and 0.4 milliliter of freshly-distilled benzoyl chloride was added and the mixture allowed to stand at room temperature for twenty hours. The reaction mixture was diluted with fifty milliliters of ether, washed successively with water, and ten per cent sodium hydroxide solution, and finally with water. The solution was then dried over sodium sulfate and the solvent was thereafter evaporated on a hot water bath, the terminal evaporation being facilitated by vacuum. The residue was heated with 25 milliliters of water under reflux for fifteen minutes, cooled, extracted with ether, washed with water, a ten per cent sodium hydroxide solution, and again with water, dried and evaporated to a volume of ten milliliters. After cooling the solution, the crystals which formed during the evaporation were removed by filtration and washed with about five milliliters of hexane. The yield was 0.44 gram (68 per cent of the theoretical) of 11α-benzoxyprogesterone melting at 179 to 181 degrees centigrade. Recrystallization from ten milliliters of ether gave a product melting at 181 to 183 degrees centigrade; $[a]_D^{23}$ of plus 88 degrees (chloroform).

Analysis.—Percent calculated for $C_{28}H_{34}O_4$: C, 77.38; H, 7.89. Found: C, 77.50; H, 7.88.

11α-hydroxyprogesterone can be converted into the corresponding 11α-acyloxy derivatives as indicated in Examples 1 to 4, by reaction with an acid anhydride or acyl halide, in an organic solvent such as pyridine or the like, with ketene or a ketene of a selected acid. Representative esters of 11α-hydroxyprogesterone thus prepared include esters of malonic, maleic, succinic, glutaric and adipic acids, and one to eight carbon atom carboxylic acid acyloxy esters of other aliphatic or cycloaliphatic, aryl, alkaryl, aralkyl, mono, di or polycarboxylic acids, wherein the acyloxy group of the thus-produced 11α-acyloxyprogesterone is, for example, formyloxy, acetoxy, propionyloxy, butyryloxy, valeryloxy, hexanoyloxy, heptanoyloxy, octanoyloxy, benzoxy, phenylacetoxy, toluoyloxy, naphthoyloxy, cyclopentanoyloxy, cyclopentylpropionyloxy, acrylyloxy, cyclohexanoyloxy, and the like. The acyl groups may also contain non-interfering substituents, such as mono or poly, halo, chloro, bromo, hydroxy, methoxy, or the like, if desired.

B. HYDROGENATION OF 11α-ACYLOXYPROGESTERONES TO 11α-ACYLOXYPREGNANE-3,20-DIONES

*Example 5.—11α-acetoxypregnane-3,20-dione*

A solution of 200 grams of 11α-acetoxyprogesterone, prepared according to Example 1 and melting at 172 to 176 degrees centigrade, in 1200 milliliters of absolute methanol was stirred with 25 grams of Raney nickel for two hours at room temperature whereafter the Raney nickel was filtered and the filtrate concentrated to 750 milliliters by distillation. The concentrated solution was hydrogenated in the presence of a 7.5 per cent palladium on zinc oxide catalyst at a hydrogen pressure of twenty pounds. Hydrogen absorption ceased after one third of the theoretical amount of hydrogen had been absorbed. The catalyst was then filtered, the filtrate diulted to 3.5 liters with absolute methanol and the solution stirred once more with 100 grams of Raney nickel. The Raney nickel was filtered, the filtrate concentrated to 750 milliliters by distillation and hydrogenation was continued in the presence of 100 grams of the 7.5 per cent palladium on zinc carbonate catalyst until the theoretical amount of hydrogen had been absorbed. The catalyst was then filtered and washed with 100 milliliters of warm absolute methanol and the combined filtrate and wash were distilled to dryness. The residue of 11α-acetoxypregnane-3,20-dione, after drying at 75 degrees centigrade in vacuo for three hours, weighed 203.4 grams, a quantitative yield of product.

*Example 6.—11α-acetoxypregnane-3,20-dione*

Three grams of 11α-acetoxyprogesterone was hydrogenated at a hydrogen pressure of about ten pounds in 100 milliliters of absolute methanol in the presence of a 7.5 per cent palladium on zinc carbonate catalyst. When hydrogenation was complete and the methanol filtrate, obtained by filtration of the catalyst, was evaporated, a quantitative yield of hydrogenated product was obtained melting at 145 to 149 degrees centigrade. A melting point curve of known mixtures of pure allo and normal 11α-acetoxypregnane-3,20-dione indicated that the product consisted of about 95 per cent normal 11α-acetoxypregnane-3,20-dione.

*Example 7.—11α-acetoxypregnane-3,20-dione*

In the same manner as described in Example 6, 1.21 grams of 11α-acetoxyprogesterone was hydrogenated in 100 milliliters of absolute methanol in the presence of a ten per cent palladium on zinc carbonate catalyst. Isolation in the same manner as described above gave a quantitative yield of product melting at 133 to 146 degrees centigrade, indicating that the product contains about ninety per cent normal 11α-acetoxypregnane-3,20-dione.

*Example 8.—11α-acetoxypregnane-3,20-dione*

In the same manner as described in Example 6, 3.33 grams of 11α-acetoxyprogesterone was hydrogenated in methanol in the presence of 0.1 gram of a thirty per cent palladium on charcoal catalyst. Isolation of the hydrogenation product gave a quantitative yield of product assaying about 85 per cent normal 11α-acetoxypregnane-3,20-dione.

*Example 9.—11α-acetoxypregnane-3,20-dione*

In the same manner as described in Example 6, 3.33 grams of 11α-acetoxyprogesterone was hydrogenated in methanol in the presence of one gram of a ten per cent palladium on calcium carbonate catalyst and one milliliter of Triton B trimethylbenzylammonium hydroxide. The quantitative yield of product assayed about 88 per cent normal 11α-acetoxypregnane-3,20-dione.

*Example 10.—11α-propionyloxypregnane-3,20-dione*

In the same manner as described in Example 6, 11α-propionyloxyprogesterone is hydrogenated in the presence of a palladium on charcoal catalyst in methanol to give a quantitative yield of hydrogenated product consisting essentially of 11α-propionyloxypregnane-3,20-dione.

*Example 11.—11α-benzoxypregnane-3,20-dione*

In the same manner as described in Example 6, 11α-benzoxyprogesterone is hydrogenated in the presence of a palladium on cadmium carbonate catalyst in methanol to give a quantitative yield of hydrogenated product consisting essentially of 11α-benzoxypregnane-3,20-dione.

In the same manner as given in Examples 1 through 11, other 11α-acyloxyprogesterones are hydrogenated in the presence of a palladium catalyst such as, for example, palladium, palladium on carriers such as, for example, calcium oxide, cadmium oxide, zinc carbonate, zinc carbonate-zinc oxide, cadmium carbonate, charcoal, palladium in the presence of zinc carbonate, or the like, in an organic solvent such as, for example, acetone, methyl ethyl ketone, hexane, ethanol, methanol, or the like, preferably an alcohol, to produce a hydrogenated product rich in the desired hydrogenated product of the normal configuration. Compounds thus-hydrogenated include 1α-formyloxyprogesterone, 11α-butyryloxyprogesterone, 11α-valeryloxyprogesterone, 11α-hexanoyloxyprogesterone, 11α-heptanoyloxyprogesterone, 11α-octanoyloxyprogesterone, and others.

C. REDUCTION OF 11α-ACYLOXYPREGNANE-3,20-DIONES

*Example 12.—pregnane-3α,11α,20-triol*

A solution of 202 grams (0.541 mole) of 11α-acetoxypregnane-3,20-dione, obtained according to the method described in Example 6, in 4.750 milliliters of methanol was mixed with 28.1 grams (0.74 mole) of sodium borohydride dissolved in 200 milliliters of water. The mixture was stirred and heated for 2.5 hours at fifty to sixty degrees centigrade whereafter 128 grams of sodium hydroxide in 430 milliliters of water was added thereto to saponify the thus-produced 11α-acetoxypregnane-3α,20-diol, and the heating was continued for one hour. The reaction mixture was kept at room temperature for sixteen hours whereafter the reaction mixture was concentrated by distillation to 3.5 liters and then neutralized with hydrochloric acid. The neutral solution was thereafter distilled until the distillation temperature reached 96 degrees centigrade. The pregnane-3α,11α,20-triol which had precipitated was filtered and dried in vacuo for sixteen hours at 65 degrees centigrade. The yield was quantitative (184 grams); melting point 193 to 197 degrees centigrade.

*Example 13.—pregnane-3α,11α,20-triol*

A solution of 3.745 grams of 11α-acetoxyprogesterone was dissolved in 100 milliliters of anhydrous methanol and hydrogenated at eleven pounds hydrogen pressure in the presence of 1.9 grams of palladium on Amberlite IRA 410 resin catalyst for thirty minutes. The catalyst was filtered and washed with methanol. The combined filtrate and wash were mixed with 500 milligrams of sodium borohydride in five milliliters of water to which had been added two drops of a 2.5 N solution of sodium hydroxide and the whole refluxed for one hour whereafter a solution of three grams of sodium hydroxide in ten milliliters of water was added thereto. Heating was continued and the refluxing solution was distilled until the methanol was removed. The aqueous residue contained white crystals which were filtered, washed with water, and then dried for sixteen hours in a vacuum desiccator. A quantitative yield of pregnane-$3\alpha,11\alpha,20$-triol melting at 181 to 194 degrees centigrade was thus obtained.

*Example 14.—Pregnane-$3\alpha,11\alpha,20$-triol*

A solution of 360 milligrams of $11\alpha$-acetoxypregnane-3,20-dione, obtained according to the method of Example 6, in fifty milliliters of anhydrous ether was mixed with 200 milligrams of lithium aluminum hydride whereupon a vigorous reaction ensued. After being maintained at room temperature for one-half hour, the reaction mixture was mixed with dilute sulfuric acid until acidic. The ether layer was separated and the aqueous layer was extracted with an equal volume of ether which was combined with the ether layer. The combined ether layers were washed with a saturated aqueous sodium chloride solution and then dried over anhydrous sodium sulfate taking care to thereafter wash the sodium sulfate thoroughly with ether. The ether was then distilled from the dry solution leaving a quantitative yield of pregnane-$3\alpha,11\alpha,20$-triol as a white powder.

*Example 15.—Pregnane-$3\alpha,11\alpha,20$-triol*

In the same manner as described in Example 13, three grams of $11\alpha$-propionyloxyprogesterone was hydrogenated at a hydrogen pressure of eleven pounds in the presence of 1.5 grams of a 7.5 per cent palladium on zinc carbonate catalyst in 45 milliliters of methanol. The thus-produced $11\alpha$-propionyloxypregnane-3,20-dione was reduced in isopropanol containing a small amount of water with 0.4 gram of sodium borohydride to $11\alpha$-propionyloxypregnane-$3\alpha,20$-diol. Treatment of the sodium borohydride reduction mixture with ten milliliters of a 5 N aqueous sodium hydroxide solution for two hours at the reflux temperature of the reaction mixture and then at about fifty degrees centigrade for sixteen hours yielded upon isolation 3.20 grams, a yield of 95.5 per cent of the theoretical based upon the starting $11\alpha$-propionyloxyprogesterone, of pregnane-$3\alpha,11\alpha,20$-triol melting at 180 to 193 degrees centigrade.

In essentially the same manner as described in Examples 12 to 15, the 3- and the 20-keto groups of other $11\alpha$-acyloxypregnane-3,20-diones are hydrogenated by hydrogenating agents such as, for example, lithium aluminum hydride, sodium borohydride, lithium borohydride, hydrogen in the presence of a catalyst such as, for example, Raney nickel, platinum, and others, in a solvent such as, for example, methanol, ethanol, isopropanol, ether, ethyl acetate, benzene, or the like, to produce $3\alpha$- and 20-hydroxy groups. Treatment of the hydrogenation product with a dilute water-methanolic sodium hydroxide solution is productive of pregnane-$3\alpha,11\alpha,20$-triol. Compounds thus converted to pregnane-$3\alpha,11\alpha,20$-triol include $11\alpha$-formyloxypregnane-3,20-dione, $11\alpha$-butyryloxypregnane-3,20-dione, $11\alpha$-valeryloxypregnane-3,20-dione, $11\alpha$-hexanoyloxypregnane-3,20-dione, $11\alpha$-heptanoyloxypregnane-3,20-dione, $11\alpha$-octanoyloxypregnane-3,20-dione, and the like.

D. OXIDATION OF PREGNANE-3,11,20-TRIOLS TO PREGNANE-3,11,20-TRIONE

*Example 16.—Pregnane-3,11,20-trione*

One gram of pregnane-$3\alpha,11\alpha,20$-triol, obtained according to the method of Example 12, was dissolved in 25 milliliters of boiling chlorobenzene and the cooled solution was added with cooling to an agitated solution of 4.5 grams technical sodium dichromate, six milliliters concentrated sulfuric acid, and 25 milliliters water. After stirring for six hours at room temperature, the chlorobenzene layer was removed, the aqueous layer extracted twice with equal volumes of benzene which were then added to the chlorobenzene, and the combined chlorobenzene and benzene solutions were washed with water and a saturated aqueous sodium chloride solution. The solvents were then evaporated by a current of air leaving a 900-milligram residue, a yield of ninety per cent of the theoretical, of pregnane-3,11,20-trione which, after triturating with a two to one mixture of ether and acetone, melted at 148 to 151 degrees centigrade.

In a similar manner, pregnane-3,11,20-trione is produced from pregnane-$3\alpha$-$11\alpha,20$-triol by the action of other oxidizing agents such as, for example, potassium dichromate, chromic acid, hydrogen peroxide, or the like.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A process for the saturation of the double bond in the 4(5)-position of an $11\alpha$-acyloxyprogesterone to produce a high proportion of $11\alpha$-acyloxypregnane-3,20-dione having the normal stereoconfiguration of hydrogen at carbon atom five of the steroid nucleus, which comprises: hydrogenating an $11\alpha$-acyloxyprogesterone wherein the acyloxy group has the formula AcO, Ac being the acyl radical of an organic carboxylic acid, with hydrogen in the presence of a palladium hydrogenation catalyst, to produce an $11\alpha$-acyloxypregnane-3,20-dione.

2. The process of claim 1 wherein the hydrogenation catalyst is palladium in the presence of a compound selected from the group consisting of the carbonate, the oxide, and mixtures of the carbonate and oxide of a group 2B element of the periodic table, and wherein the hydrogenation is carried out in the presence of an alkanol containing from one to eight carbon atoms, inclusive.

3. A process for the saturation of the double bond in the 4(5)-position of $11\alpha$-acetoxyprogesterone to produce a high proportion of $11\alpha$-acetoxypregnane-3,20-dione having the normal stereoconfiguration of hydrogen at carbon atom five of the steroid nucleus, which comprises: hydrogenating $11\alpha$-acetoxyprogesterone with hydrogen in the presence of a hydrogenation catalyst comprising palladium in the presence of a compound selected from the group consisting of the carbonate, the oxide, and mixtures of the carbonate and oxide of a Group 2B element of the periodic table, to produce $11\alpha$-acetoxypregnane-3,20-dione.

4. A process for the saturation of the double bond in the 4(5)-position of $11\alpha$-acetoxyprogesterone to produce a high proportion of $11\alpha$-acetoxypregnane-3,20-dione having the normal stereoconfiguration of hydrogen at carbon atom five of the steroid nucleus, which comprises: hydrogenating $11\alpha$-acetoxyprogesterone with hydrogen in the presence of a palladium-zinc oxide hydrogenation catalyst comprising from about five to about ten per cent by weight of palladium, to produce $11\alpha$-acetoxypregnane-3,20-dione.

5. A process for the production of $11\alpha$-acetoxypregnane-3,20-dione, including a high proportion of $11\alpha$-acetoxypregnane-3,20-dione having the normal stereoconfiguration of hydrogen at carbon atom five of the steroid nucleus, from $11\alpha$-hydroxyprogesterone, which comprises: mixing $11\alpha$-hydroxyprogesterone with the acetylating agent to produce $11\alpha$-acetoxypregnane-3,20-dione and thereafter hydrogenating the thus-produced $11\alpha$-acetoxyprogesterone with hydrogen in the presence of a hydrogenation catalyst consisting of palladium in the presence of a compound selected from the group consisting of the carbonate, the oxide, and mixtures of the carbonate and oxide of a group 2B element of the periodic table, to produce 11α-acetoxypregnane-3,20-dione.

6. A process which comprises: hydrogenating an 11α-acyloxyprogesterone wherein the acyloxy group has the formula AcO, Ac being the acyl radical of an organic carboxylic acid, with hydrogen in the presence of a palladium hydrogenation catalyst to produce 11α-acyloxypregnane-3,20-dione, and thereafter reducing the thus-produced 11α-acyloxypregnane-3,20-dione with a reducing agent to convert the 3- and 20-keto groups in the molecule to 3α- and 20-hydroxy groups.

7. A process which comprises: hydrogenating 11α-acetoxyprogesterone with hydrogen in the presence of a palladium hydrogenation catalyst to produce 11α-acetoxypregnane-3,20-dione and thereafter reducing the 11α-acetoxypregnane-3,20-dione with a reducing agent selected from the group consisting of hydrogen in the presence of a hydrogenation catalyst, lithium aluminum hydride, sodium borohydride, and lithium borohydride to convert the 3- and 20-keto groups in the molecule to 3α- and 20-hydroxy groups.

8. A process for the production of pregnane-3α,11α,20-triol which comprises: hydrogenating an 11α-acyloxyprogesterone wherein the acyloxy group has the formula AcO, Ac being the acyl radical of an organic carboxylic acid, with hydrogen in the presence of a palladium hydrogenation catalyst to produce 11α-acyloxypregnane-3,20-dione; removing the hydrogenation catalyst and reducing the hydrogenation product with an excess of sodium borohydride to produce an 11α-acyloxypregnane-3α,20-diol; and hydrolyzing the thus-produced 11α-acyloxypregnane-3α,20-diol to pregnane-3α,11α,20-triol.

9. A process for the production of pregnane-3,11,20-trione which comprises: hydrogenating an 11α-acyloxyprogesterone wherein the acyloxy group has the formula AcO, Ac being the acyl radical of an organic carboxylic acid, with hydrogen in the presence of a palladium hydrogenation catalyst to produce an 11α-acyloxypregnane-3,20-dione; reducing the thus-produced 11α-acyloxypregnane-3,20-dione with a reducing agent to convert the 3- and 20-keto groups of the molecule to 3α- and 20-hydroxy groups; hydrolyzing the reduction product to produce pregnane-3α,11α,20-triol; and oxidizing the thus-produced pregnane-3α,11α,20-triol with an oxidizing agent to produce pregnane-3,11,20-trione.

10. A process for the production of pregnane-3,11,20-trione which comprises: hydrogenating 11α-acetoxyprogesterone with hydrogen in the presence of a hydrogenation catalyst comprising palladium in the presence of a compound selected from the group consisting of the carbonate, the oxide, and mixtures of the carbonate and oxide of a group 2B element of the periodic table to produce an 11α-acetoxypregnane-3,20-dione; separating the hydrogenation catalyst and reducing the thus-produced 11α-acetoxypregnane-3,20-dione in situ with an excess of sodium borohydride to produce an 11α-acetoxypregnane-3α,20-diol; hydrolyzing the reaction product to produce pregnane-3α,11α,20-triol; and oxidizing the thus-produced pregnane-3α,11α,20-triol with about three equivalents of chromic acid to produce pregnane-3,11,20-trione.

11. A process for the production of a pregnane-3,11,20-trione which comprises: mixing 11α-hydroxyprogesterone with an esterifying agent to produce an 11α-acyloxyprogesterone wherein the acyloxy group has the formula AcO, Ac being the acyl radical of an organic carboxylic acid; hydrogenating the 11α-acyloxyprogesterone with hydrogen in the presence of a palladium hydrogenation catalyst to produce an 11α-acyloxypregnane-3,20-dione; reducing the 11α-acyloxypregnane-3,20-dione with a reducing agent to convert the 3- and 20-keto groups in the molecule to 3α- and 20-hydroxy groups; hydrolyzing the reaction product to produce pregnane-3α,11α,20-triol; and contacting the thus-produced pregnane-3α,11α,20-triol with about three equivalents of an oxidizing agent to produce pregnane-3,11,20-trione.

References Cited in the file of this patent

Fieser et al.: Natural Products Related to Phenanthrene, 3rd Ed., pp. 98, 99, and 417–422 (1949).